No. 693,955. Patented Feb. 25, 1902.
C. M. DAY.
CLUTCH MECHANISM.
(Application filed Oct. 11, 1901.)
(No Model.)
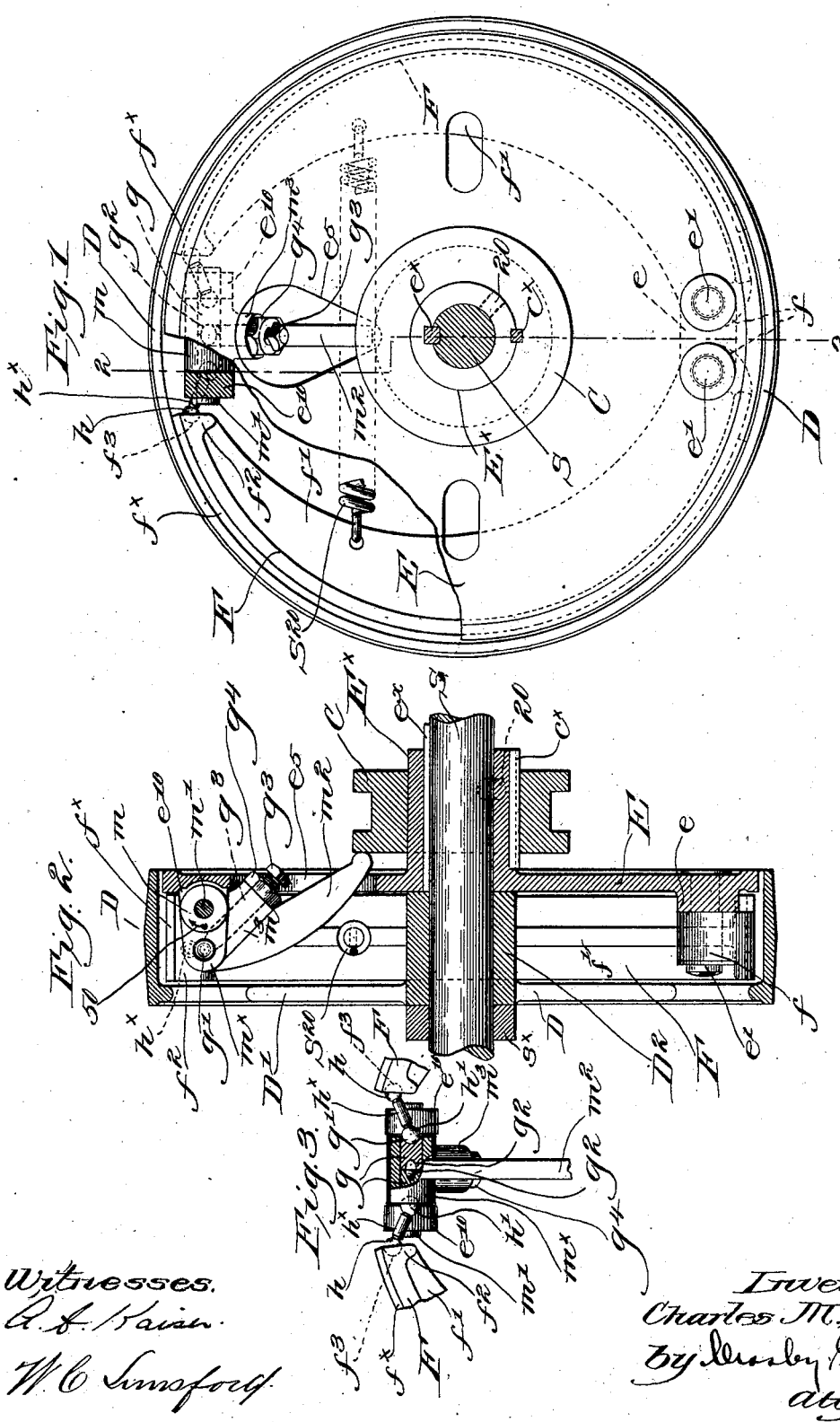
Witnesses.
Inventor.
Charles M. Day.
By Crosby Gregory
attys.

UNITED STATES PATENT OFFICE.

CHARLES M. DAY, OF HOPEDALE, MASSACHUSETTS, ASSIGNOR TO DRAPER COMPANY, OF HOPEDALE, MASSACHUSETTS, A CORPORATION OF MAINE.

CLUTCH MECHANISM.

SPECIFICATION forming part of Letters Patent No. 693,955, dated February 25, 1902.

Application filed October 11, 1901. Serial No. 78,296. (No model.)

*To all whom it may concern:*

Be it known that I, CHARLES M. DAY, a citizen of the United States, and a resident of Hopedale, in the county of Worcester and State of Massachusetts, have invented an Improvement in Clutch Mechanism, of which the following description, in connection with the accompanying drawings, is a specification, like numerals on the drawings representing like parts.

This invention has for its object the production of simple, powerful, and rapid-acting clutch mechanism, the construction being such that the parts are arranged in a compact and well-protected manner and requiring comparatively little force to effect the clutching of the driving and driven members.

The mechanism forming the subject-matter of this application is particularly adapted for use in connection with looms for weaving, as it may be applied directly to the driving-shaft thereof and obviates the use of the usual fast and loose pulleys and a belt-shifter, as will be clearly apparent hereinafter, though the invention is not restricted to such application, as it is adapted for use with any power-driven apparatus requiring the interposition of a clutch mechanism or fast and loose pulleys between it and the source of power.

Various novel features of the invention will be hereinafter described, and particularly pointed out in the following claims.

Figure 1 is a side elevation, partly broken out and in section, of a clutch mechanism illustrating one embodiment of the invention. Fig. 2 is a sectional view thereof on the irregular line 2 2, Fig. 1, looking toward the right; and Fig. 3 is a detail, partly in section, of the means for controlling the friction-segments by which the driving and driven members are clutched and unclutched, said means being viewed from the left-hand side of Fig. 2.

The clutch mechanism is herein shown as mounted upon a shaft S, which may be the driving-shaft of a loom or other power apparatus, and herein the driving member of the clutch mechanism is shown as a pulley, comprising an annular portion or flange D, connected by spokes or arms D' with a hub $D^2$, rotatably mounted on the shaft and held from longitudinal movement thereon in one direction by a fast collar $s^\times$, Fig. 2. The flange D surrounds the periphery of the driven member E of the clutch with a slight clearance, said member being illustrated as a circular disk having an elongated hub $E^\times$ extended from the outer face thereof and connected with the shaft, as by a key $e^\times$, longitudinal movement of said member on the shaft being prevented in any suitable manner, as by a set-screw 20. (See dotted lines, Figs. 1 and 2.) A boss $e$ near the periphery of the disk E on its inner face supports two studs $e'$, projecting from the inner face of said disk parallel to the shaft, and upon said studs the hubs $f$ of two like segments F are pivotally mounted.

As shown in Fig. 1, the segments are located at opposite sides of the shaft S and closely adjacent the inner face of the flange D, the fulcrumed ends of said segments being quite near each other, while their opposite free ends are separated for a greater distance for a purpose to be described. Each segment has a longitudinal strengthening or stiffening web $f'$, a friction pad or shoe $f^\times$, of leather or other suitable material, being secured to the convex face of each segment to coöperate with the flange D, and it will be seen that a very extended friction-surface is provided by the shoes. The free end of each segment is enlarged or thickened, as at $f^2$, and a semispherical socket or seat $f^3$ is formed therein (shown in dotted lines, Figs. 1 and 3) to receive the outer ball-like or rounded ends $h$ of short arms or links $h^\times$, which form part of the means for separating the segments to bring their shoes $f^\times$ into operative engagement with the flange D. As shown in Figs. 1 and 3, these arms or links $h^\times$ are not in alinement and normally their inner ends are dropped toward the shaft, such inner ends being shown as rounded or ball-like, as at $h'$, to enter sockets $g'$ in the outer ends of two short cylindrical plugs $g$, placed end to end in a transverse sleeve-like portion $m^\times$ of a rocker $m$, the sleeve being eccentric to a fulcrum-pin $m'$, by which the rocker is supported between ears $e^{10}$, projecting from the inner face of the disk E. The ears are between the free ends of the segments, and it will be manifest that by turning the rocker on its fulcrum to move the eccentric portion $m^\times$ nearer the flange D the arms or links $h^\times$ will tend to move into alinement and operating as compression members to force the segments tightly against the inner face of the flange to thereby clutch the driving and driven members together. Such separation of the segments is resisted by a strong spring $S^{20}$, attached at its opposite ends to the segment-webs, as best shown in Fig. 1, the pull of the spring releasing the clutch members from coöperative engagement by drawing the segments inward, the links $h^×$ never being thrown into alinement when the clutch members are operatively connected. The rocker is provided with a depending extension $m^2$, which passes through an opening $e^5$ in the disk E and at its free end bears against an annularly-grooved collar C, mounted on the hub $E^×$ and rotatable therewith by means of a key $c^×$, so that the collar may be slid longitudinally upon the shaft by a yoke or similar device. (Not shown.) When the collar is slid toward the member E, the extension $m^2$ will be moved to turn the rocker $m$ in the direction of arrow 50, Fig. 2, and the driving and driven members will be clutched, as has been described. By sliding the collar C to the right, Fig. 2, the spring $S^{20}$ operates to turn the rocker opposite to the arrow 50, and the parts of the clutch will return to the position assumed when the driving and driven members are unclutched. The collar is retained in clutching position by or through the actuating-yoke referred to, and if the mechanism be applied to a loom the locking-plate for the shipper-handle, of well-known construction, will maintain the clutch mechanism in operative or inoperative position, as the case may be. The arms or links $h^×$ and the coöperating rocker constitute a species of compound toggle connection between the free ends of the friction-segments, the straightening or setting tendency induced by turning of the rocker effecting the clutching of the driving and driven members.

In order to provide for wear of the friction-shoes $f^×$ or other portions of the mechanism without necessitating a variation in the arc of movement of the rocker $m$ to compensate for such wear, the plugs $g$ are made separate, and their adjacent inner ends are recessed, as at $g^2$, Fig. 3, to receive the conical or tapering end of a screw-stud $g^3$, which is screwed into an internally-threaded boss $m^3$, forming a part of the rocker $m$, the stud entering the sleeve-like portion $m^×$ at right angles thereto. (See Fig. 2.) By loosening a check-nut $g^4$ and slightly setting up the stud $g^3$ the plugs $g$ will be moved longitudinally away from each other far enough to take up the wear, after which the check-nut is tightened to hold the stud in adjusted position.

The construction and arrangement of the mechanism herein shown and described may be modified or changed in various particulars without departing from the spirit and scope of the invention.

Having fully described my invention, what I claim as new, and desire to secure by Letters Patent, is—

1. In apparatus of the class described, driving and driven members, an annular flange on one, friction-segments fulcrumed on the other member and movable toward and from the flange, to clutch and unclutch said members, respectively, and means mounted on the segment-carrying member to operate the segments, said means comprising a compound toggle connection between the free ends of the segments, said connection including a rocking member and eccentrically-connected toggle-arms, and a controlling device for said connection.

2. In apparatus of the class described, driving and driven members, an annular flange on one, friction-segments fulcrumed on the other member and movable toward and from the flange, to clutch and unclutch said members, respectively, and means mounted on the segment-carrying member to operate the segments, said means comprising a rocker, normally non-alined toggle-arms interposed between the free ends of the segments and the ends of the rocker and eccentrically connected with the latter, and a device to turn the rocker and thereby tend to bring said toggle-arms into alinement to separate the friction-segments.

3. In apparatus of the class described, driving and driven members, an annular flange on one, friction-segments fulcrumed on the other member and movable toward and from the flange, to clutch and unclutch said members, respectively, and means mounted on the segment-carrying member to operate the segments, said means including a rocker interposed between the free ends of the segments, and compression-arms between the latter and the rocker and eccentrically connected with said rocker, rotative movement of the rocker tending to bring the arms into alinement and thereby forcing the segments into operative engagement with the annular flange, to clutch the driving and driven members together.

4. In apparatus of the class described, a shaft to be rotated, driving and driven members of a clutch mounted thereon, the driving member being rotatable on the shaft and having an annular flange, the driven member being connected with the shaft to rotate therewith and having its circumference loosely surrounded by the flange, oppositely-movable friction-segments fulcrumed on the driven member and adapted to coöperate with the flange of the driving member, a compound toggle connection between the free ends of the segments and supported by the driven member, said connection including a rocker and toggle-arms eccentrically connected therewith at their inner ends, and means to turn the rocker and thereby operate said connection to separate the segments and force them into operative engagement with the flange of the driving member.

5. In apparatus of the class described, driving and driven members, an annular flange on one, friction-segments fulcrumed on the other member and movable toward and from the flange, to clutch and unclutch said members, respectively, and means mounted on the segment-carrying member to operate the segments, said means comprising a rocker, normally non-alined toggle-arms interposed between the free ends of the segments and the ends of the rocker and eccentrically connected with the latter, a device to turn the rocker and thereby tend to bring said toggle-arms into alinement, and an adjusting device for said means, to compensate for wear.

6. A shaft to be rotated, a clutch thereon comprising driving and driven members, the driving member having an annular flange and being rotatable on the shaft, friction-segments fulcrumed on the driven member at opposite sides of the shaft, said member being fast on the shaft, a rocker fulcrumed on the driven member between the free ends of the segments, toggle-arms seated at their outer ends in said segments and at their inner ends supported by the rocker eccentric to its fulcrum, said toggle-arms being out of alinement, means to turn said rocker and thereby cause the toggle-arms to approach alinement, to separate the segments and force them into operative engagement with the flange of the driving member, and a spring to draw the segments inward.

7. In apparatus of the class described, a driving member having an annular flange, a disk-like driven member loosely inclosed by the flange, friction-segments fulcrumed at their adjacent ends on said driven member and separable at their other ends to engage the flange, a compound toggle connection between the free ends of the segments and supported by the disk-like member, said connection including non-alined toggle-arms, laterally-separable bearings for the inner ends of said toggle-arms, means to control said connection, and an adjusting device to laterally and simultaneously separate said bearings, to compensate for wear.

In testimony whereof I have signed my name to this specification in the presence of two subscribing witnesses.

CHARLES M. DAY.

Witnesses:
GEORGE OTIS DRAPER,
ERNEST W. WOOD.